UNITED STATES PATENT OFFICE.

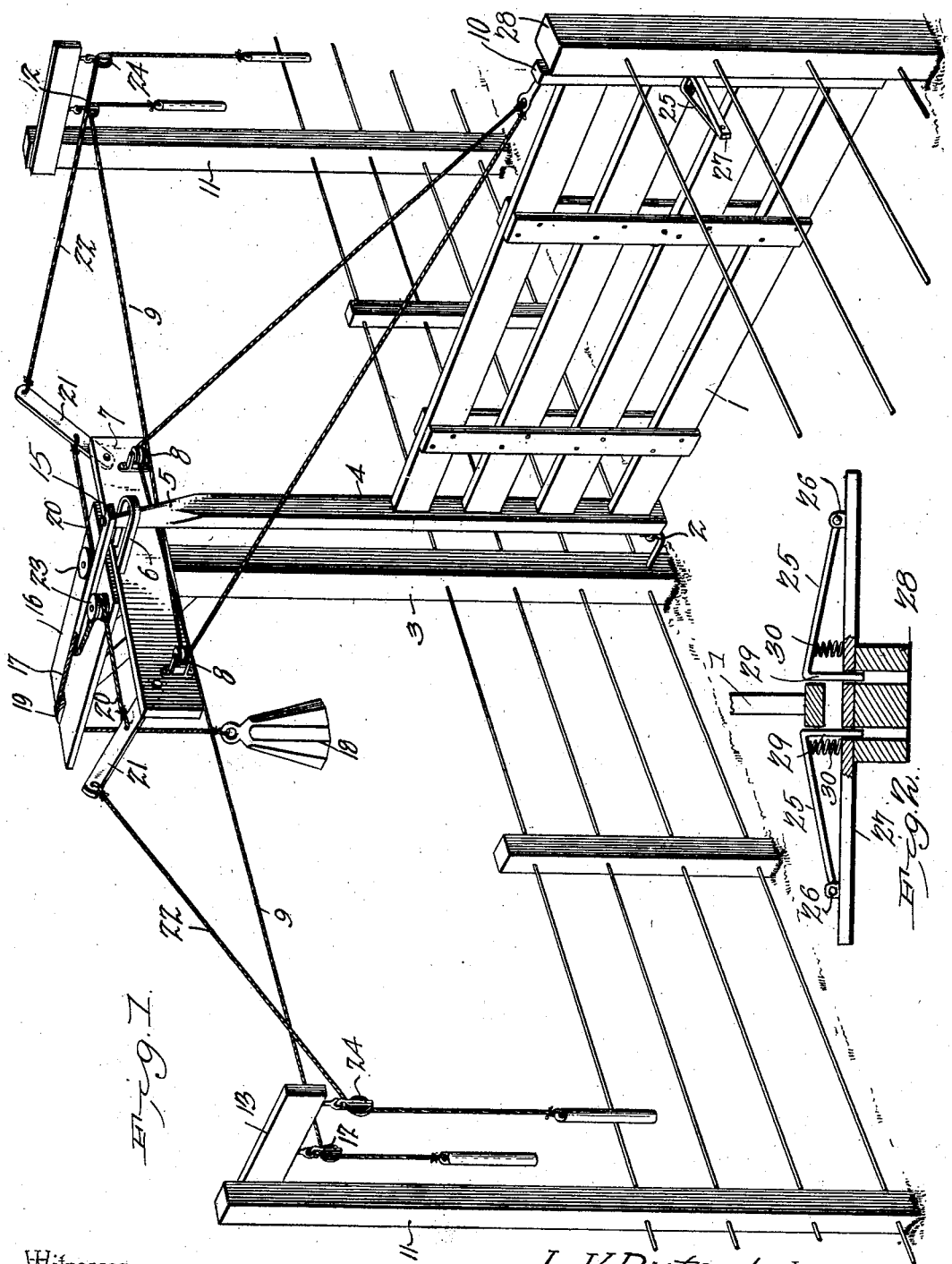

LUTHER V. BUFORD, OF VIRGINIA CITY, MONTANA.

GATE.

SPECIFICATION forming part of Letters Patent No. 720,662, dated February 17, 1903.

Application filed October 7, 1902. Serial No. 126,318. (No model.)

*To all whom it may concern:*

Be it known that I, LUTHER V. BUFORD, a citizen of the United States, residing at Virginia City, in the county of Madison and State of Montana, have invented a new and useful Gate, of which the following is a specification.

The invention relates to improvements in gates.

The object of the present invention is to improve the construction of gates and to provide an exceedingly simple and inexpensive one of great strength and durability adapted to be readily manufactured and capable of being operated at a distance from either side of it by a person on horseback or in a vehicle.

A further object of the invention is to provide a gate of this character which when operated will swing away from the operator and not come in contact with the horse or frighten or injure the same.

The invention consists in the construction and novel combination and arrangement of parts hereinafter fully described, illustrated in the accompanying drawings, and pointed out in the claims hereto appended.

In the drawings, Figure 1 is a perspective view of a gate constructed in accordance with this invention. Fig. 2 is a horizontal sectional view illustrating the construction of the keeper.

Like numerals of reference designate corresponding parts in all the figures of the drawings.

1 designates a swinging gate connected by a suitable hinge 2 at its bottom with a post or upright 3 and having its inner end bar 4 extended vertically to form an arm, which is provided with a rounded upper portion 5. The rounded upper portion of the arm 5 of the gate is arranged within an elongated loop 6 and is adapted to swing backward and forward in the same and is capable of a limited rotation therein to permit the gate to open and close. The loop, which is approximately U-shaped, is arranged near the top of the post or upright, which has a horizontal bar or piece 7 secured to its upper end and forming with it an approximately T-shaped support. The arms or projecting portions of the top piece 7 have mounted upon them guides 8, located at opposite sides of the gate and consisting, preferably, of pulleys mounted in suitable brackets and receiving operating ropes or cables 9, which are connected at their inner adjacent ends to the gate at the front or outer end bar 10 thereof by means of an eyebolt or other suitable fastening device. The operating ropes, cables, or other flexible connections extend rearward and upward from the front of the gate to the guides 8 and across at the back of the gate and extend from the support to suitable uprights or posts 11, located at opposite sides of the gate and arranged a suitable distance therefrom, so that a horse will not come in contact with the gate when the latter is operated from a vehicle or by a person on horseback. The outer portions of the operating ropes or cables depend from suitable guides 12, which are secured to arms 13 of the posts or uprights 11. When one of the operating ropes or cables 9 is pulled, the gate will be tilted upwardly and swung laterally away from the operator and will open automatically.

The upper end of the arm of the gate is connected with the front end of a reciprocatory slide or bar 15, arranged at the top of the support on a bracket or board 16 and connected at its rear end with a rope or cable 17, to which is attached a weight 18 for counterbalancing the gate. The flexible connection 17 passes over a pulley 19, forming a guide and mounted at the back of the bracket. The rear end of the bar or slide 15 is also connected by a pair of ropes or cables 20 with levers 21, fulcrumed on the arms of the supporting-frame and connected with operating-ropes 22. The flexible connections 20 pass around pulleys 23, which form guides and which are mounted on the bracket of the supporting-frame at opposite sides of the slide or bar 15. The levers 21 are fulcrumed at their lower ends and are connected at points between their ends with the ropes or cables 20. The upper ends of the levers are connected with the operating ropes or cables 22, which depend from suitable guides 24 of the arms 13 of the posts or uprights 11. The operating ropes or cables are provided with suitable handles or grips, which form stops to prevent the operating ropes or cables from becoming accidentally withdrawn from the guides, and they also hold the operating-ropes in proper position. When the gate is closed, the outer portions of the operating ropes or cables 9 are shorter than the outer portions of the other operating ropes or cables, and the latter are shorter than the former when the gate is open, so that it is only necessary for the operator to pull the shorter operating rope or cable to secure the necessary movement of the gate. The gate when closed engages a keeper consisting of a pair of spring-actuated members 25, consisting of rods connected at their outer ends by pivots 26 to a supporting-piece 27, which is secured to a latch-post 28. The inner ends of the rods are bent at an angle to form arms 29, which extend through the support 27 and project in the sockets 28 of the latch-post. The body portions of the pivoted sections or members are normally held at an acute angle to the plane of the adjacent face of the latch-post by means of coiled springs 30, interposed between the support on the bars or members and suitably secured to the same. The arms of the bars or members are spaced apart to receive the gate between them, whereby the gate is firmly held in its closed position. The rearward tilting of the gate carries it out of engagement with the keeper, and when the gate closes it depresses one of the springs and passes over the adjacent section or member and is stopped by the other section or member to prevent it from swinging past the latch-post.

It will be seen that the operating mechanism is exceedingly simple and inexpensive in construction, that it is capable of opening a swinging gate away from the operator to avoid striking or frightening a horse or other draft-animal, and that the pulling of an operating rope or cable changes the position of the gate and causes the same to swing automatically.

What is claimed is—

1. The combination with a support of a gate hinged at the bottom and provided at the top with an arm, a guide receiving the arm and permitting a limited movement of the same, a slide connected with the arm, and operating mechanism connected with the slide for moving the same forward, substantially as described.

2. The combination of a gate hinged at the bottom and provided at the top with an arm, a guide receiving the arm, operating mechanism connected with the gate for moving the arm backward in the guide to open the gate, a reciprocating bar or slide connected with the arm, and means for moving the same forward to close the gate, substantially as described.

3. The combination of a gate hinged at the bottom and provided at the top with an arm, a guide receiving the arm, a reciprocating slide or bar connected with the arm, and operating mechanism for actuating the slide or bar, substantially as described.

4. The combination of a support, a gate hinged at the bottom and provided at the top with an arm, a reciprocating slide or bar connected with the arm, guides mounted on the support and located at opposite sides of the slide or bar, flexible connections arranged on the guides and connected with the slide or bar, and means for operating the flexible connections, substantially as described.

5. The combination of a support, a gate hinged at the bottom and provided at its upper portion with an arm, a guide receiving the arm, a slide connected at its front with the arm, a flexible connection attached to the slide at the rear thereof, and provided with a weight for counterbalancing the gate, and operating mechanism for operating the arm, substantially as described.

6. The combination of a support, a gate hinged at the bottom and provided at the top with an arm, a guide receiving the arm, a slide or bar connected with the arm, a counterbalancing-weight connected with the slide or bar, guides arranged at opposite sides of the slide or bar, levers fulcrumed on the support at opposite sides thereof, flexible connections arranged on the guides and extending from the slide or bar to the levers, and operating mechanism connected with the lever, substantially as described.

7. The combination of a support, a gate hinged at the bottom and provided at the top with an arm, a loop extending from the support and receiving the arm, a slide or bar connected with the arm, pulleys located at opposite sides of and in rear of the slide or bar, a flexible connection arranged on the rear pulley and attached to the guide or bar and provided with a weight, levers fulcrumed at opposite sides of the support, flexible connections arranged on the side pulleys and extending from the slide or bar to the levers, means for operating the levers, and operating ropes or cables connected with the front of the gate and extending rearward at the sides thereof and crossed at the back thereof, substantially as described.

In testimony that I claim the foregoing as my own I have hereto affixed my signature in the presence of two witnesses.

LUTHER V. BUFORD.

Witnesses:
J. H. POWELL,
G. G. WHEAT.